United States Patent [19]

Okazaki et al.

[11] Patent Number: 5,151,940
[45] Date of Patent: Sep. 29, 1992

[54] METHOD AND APPARATUS FOR EXTRACTING ISOLATED SPEECH WORD

[75] Inventors: Makoto Okazaki, Higashimurayama; Koji Eto, Tokyo, both of Japan

[73] Assignee: Fujitsu Limited, Kawasaki, Japan

[21] Appl. No.: 622,285

[22] Filed: Dec. 7, 1990

Related U.S. Application Data

[63] Continuation of Ser. No. 287,284, Dec. 21, 1988, abandoned.

[30] Foreign Application Priority Data

Dec. 24, 1987 [JP] Japan .................. 62-333852

[51] Int. Cl.⁵ .................................. G10L 5/00
[52] U.S. Cl. ........................................ 381/43
[58] Field of Search ........................... 381/43

[56] References Cited

U.S. PATENT DOCUMENTS 4,401,849 8/1983 Ichikawa et al. .................. 381/46
4,426,730 1/1984 Lajotte ............................ 381/46
4,817,159 3/1989 Hoshimi .......................... 381/43

OTHER PUBLICATIONS

R. J. McAulay, Optimum Speech Classification and its Application to Adaptive Noise Cancellation, IEEE International Conf. on Acoustics, Speech & Signal Processing, New York, May 24, 1990.
European Search Report for EP-88-12-1595, The Hague (May 24, 1990).

*Primary Examiner*—Emanuel S. Kemeny
*Attorney, Agent, or Firm*—Staas & Halsey

[57] ABSTRACT

An isolated speech word is extracted from an input speech signal. First, the speech signal is divided into a high frequency band signal and a low frequency band signal. Next, the power levels of each of the high and low frequency band signals are independently compared with respective threshold levels. Finally, the front and the end of the speech word are detected from these independent comparisons.

10 Claims, 14 Drawing Sheets

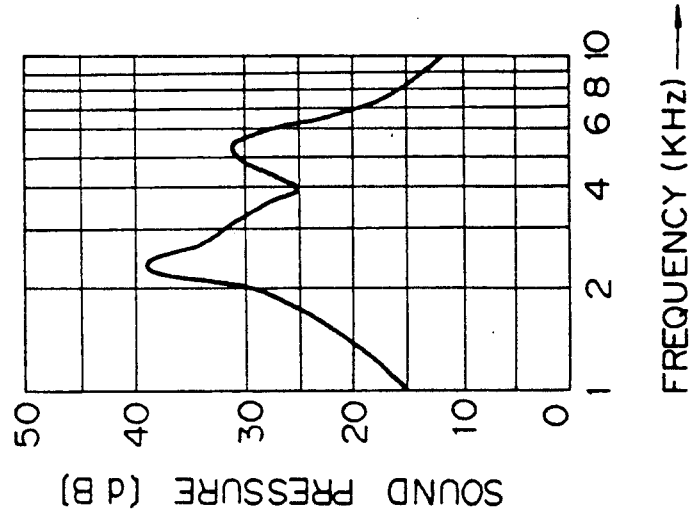
Fig. 4B (PRIOR ART) "f"
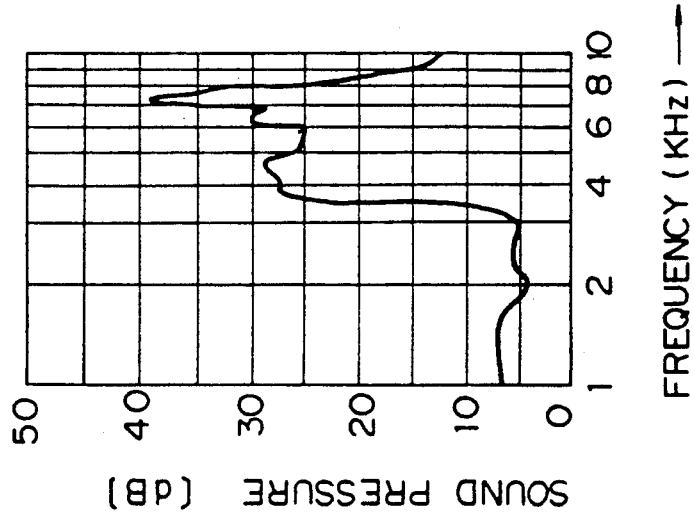
Fig. 4A (PRIOR ART) "s"

Fig. 11A

| FRAME No. | CH1 | CH2 | CH3 | CH4 | CH5 | CH6 | CH7 | CH8 | EXTRACTED SPEECH POWER | DETECTED VOWEL POWER | DETECTED CONSONANT POWER |
|---|---|---|---|---|---|---|---|---|---|---|---|
| 98 | 4 | 4 | 4 | 4 | 4 | 4 | 4 | 4 | 4 | 4 | 4 |
| 99 | 4 | 4 | 4 | 4 | 4 | 4 | 4 | 4 | 4 | 4 | 4 |
| 100 | 4 | 4 | 4 | 4 | 4 | 4 | 4 | 4 | 4 | 4 | 4 |
| 101 | 4 | 4 | 4 | 4 | 4 | 4 | 4 | 4 | 4 | 4 | 4 |
| 102 | 4 | 4 | 4 | 4 | 5 | 13 | 7 | 6 | 4 | 4 | 7 |
| 103 | 6 | 4 | 4 | 4 | 4 | 5 | 4 | 4 | 4 | 4 | 4 |
| 104 | 4 | 4 | 4 | 4 | 4 | 8 | 6 | 7 | 7 | 4 | 6 |
| 105 | 4 | 4 | 4 | 4 | 5 | 6 | 7 | 10 | 9 | 4 | 7 FRONT |
| 106 | 4 | 4 | 4 | 4 | 5 | 12 | 16 | 19 | 14 | b⌈14 | a⌈13 PRESENT INVENTION |
| 107 | 6 | 13 | 13 | 6 | 9 | 21 | 23 | 15 | 14 | 14 | 17 PRIOR ART "S" |
| 108 | 13 | 30 | 28 | 5 | 9 | 19 | 40 | 31 | 69 | 26 | 24 "A" |
| 109 | 25 | 19 | 30 | 24 | 12 | 23 | 38 | 28 | 74 | 30 | 25 |
| 110 | 48 | 46 | 57 | 34 | 46 | 119 | 209 | 125 | 66 | 64 | 124 |
| 111 | 54 | 44 | 62 | 49 | 53 | 154 | 175 | 110 | 98 | 59 | 123 |
| 112 | 57 | 42 | 37 | 108 | 71 | 113 | 123 | 98 | 120 | 44 | 101 |
| 113 | 56 | 46 | 65 | 79 | 141 | 141 | 111 | 132 | 88 | 75 | 131 |
| 114 | 54 | 47 | 77 | 43 | 117 | 253 | 213 | 144 | 85 | 78 | 181 |
| 115 | 54 | 45 | 51 | 136 | 116 | 124 | 173 | 116 | 101 | 56 | 132 |
| 116 | 23 | 24 | 37 | 134 | 96 | 102 | 102 | 83 | 68 | 38 | 95 |
| 117 | 4 | 4 | 4 | 74 | 101 | 152 | 126 | 119 | 45 | 4 | 81 |
| 118 | 4 | 4 | 4 | 71 | 61 | 92 | 98 | 74 | 4 | 4 | 124 |
| 119 | 4 | 4 | 4 | 4 | 80 | 63 | 39 | 27 | 4 | 4 | 52 |
| 120 | 4 | 4 | 4 | 4 | 5 | 7 | 5 | 6 | 4 | 4 | 5 |
| 121 | 4 | 4 | 4 | 4 | 4 | 4 | 4 | 4 | 4 | 4 | 4 |
| 122 | 4 | 4 | 4 | 4 | 4 | 4 | 4 | 4 | 4 | 4 | 4 |
| 123 | 4 | 4 | 4 | 4 | 4 | 4 | 4 | 4 | 4 | 4 | 4 |
| 124 | 4 | 4 | 4 | 4 | 4 | 4 | 4 | 4 | 4 | 4 | 4 |

| FRAME No. | CH1 | CH2 | CH3 | CH4 | CH5 | CH6 | CH7 | CH8 | | | |
|---|---|---|---|---|---|---|---|---|---|---|---|
| 125 | 4 | 4 | 4 | 4 | 4 | 4 | 4 | 4 | 4 | 4 | 4 |
| 126 | 4 | 4 | 4 | 4 | 4 | 4 | 4 | 4 | 4 | 4 | 4 |
| 127 | 4 | 4 | 4 | 4 | 4 | 4 | 4 | 4 | 4 | 4 | 4 |
| 128 | 4 | 4 | 4 | 4 | 4 | 4 | 4 | 4 | 4 | 4 | 4 |
| 129 | 4 | 7 | 11 | 32 | 73 | 104 | 210 | 255 | 86 | 13 | 160 |
| 130 | 58 | 6 | 8 | 22 | 72 | 75 | 57 | 44 | 35 | 10 | 62 |
| 131 | 52 | 91 | 80 | 75 | 74 | 78 | 63 | 59 | 72 | 76 | 68 |
| 132 | 40 | 79 | 84 | 57 | 40 | 30 | 33 | 42 | 52 | 68 | 36 |
| 133 | 43 | 66 | 68 | 62 | 59 | 62 | 40 | 41 | 54 | 59 | 50 |
| 134 | 34 | 61 | 71 | 64 | 58 | 39 | 35 | 42 | 51 | 59 | 43 |
| 135 | 37 | 48 | 58 | 82 | 58 | 39 | 34 | 35 | 48 | 55 | 41 |
| 136 | 22 | 54 | 73 | 78 | 44 | 31 | 27 | 32 | 47 | 60 | 33 |
| 137 | 25 | 34 | 52 | 60 | 55 | 42 | 37 | 39 | 42 | 42 | 30 |
| 138 | 25 | 40 | 58 | 65 | 47 | 34 | 29 | 30 | 41 | 47 | 30 |
| 139 | 22 | 40 | 56 | 80 | 46 | 28 | 23 | 32 | 40 | 50 | 33 |
| 140 | 14 | 44 | 61 | 65 | 41 | 26 | 23 | 39 | 39 | 48 | 30 |
| 141 | 13 | 29 | 51 | 58 | 40 | 31 | 30 | 30 | 35 | 38 | 28 |
| 142 | 14 | 26 | 43 | 46 | 39 | 28 | 27 | 33 | 31 | 32 | 30 |
| 143 | 17 | 31 | 42 | 41 | 40 | 26 | 23 | 29 | 30 | 37 | 22 |
| 144 | 14 | 34 | 47 | 50 | 43 | 29 | 25 | 24 | 33 | 29 | 20 |
| 145 | 14 | 27 | 39 | 38 | 31 | 21 | 19 | 26 | 26 | 28 | 18 |
| 146 | 11 | 28 | 35 | 37 | 30 | 19 | 16 | 19 | 24 | 21 | c 10 |
| 147 | 9 | 16 | 25 | 32 | 28 | 17 | 14 | 17 | 19 | 14 | 4 |
| F10 148 | 4 | 12 | 16 | 22 | 14 | 8 | 7 | 16 | 12 d | 4 | 4 |
| 149 | 4 | 4 | 4 | 7 | 6 | 4 | 4 | 5 | 4 | 4 | 4 |
| 150 | --- | --- | --- | --- | --- | --- | --- | --- | --- | --- | --- |

EXTRACTED SPEECH POWER → (column 9)
DETECTED VOWEL POWER → (column 10)
DETECTED CONSONANT POWER → (column 11)

Labels: 'T', 'O', 'U'

END ← PRESENT INVENTION / PRIOR ART

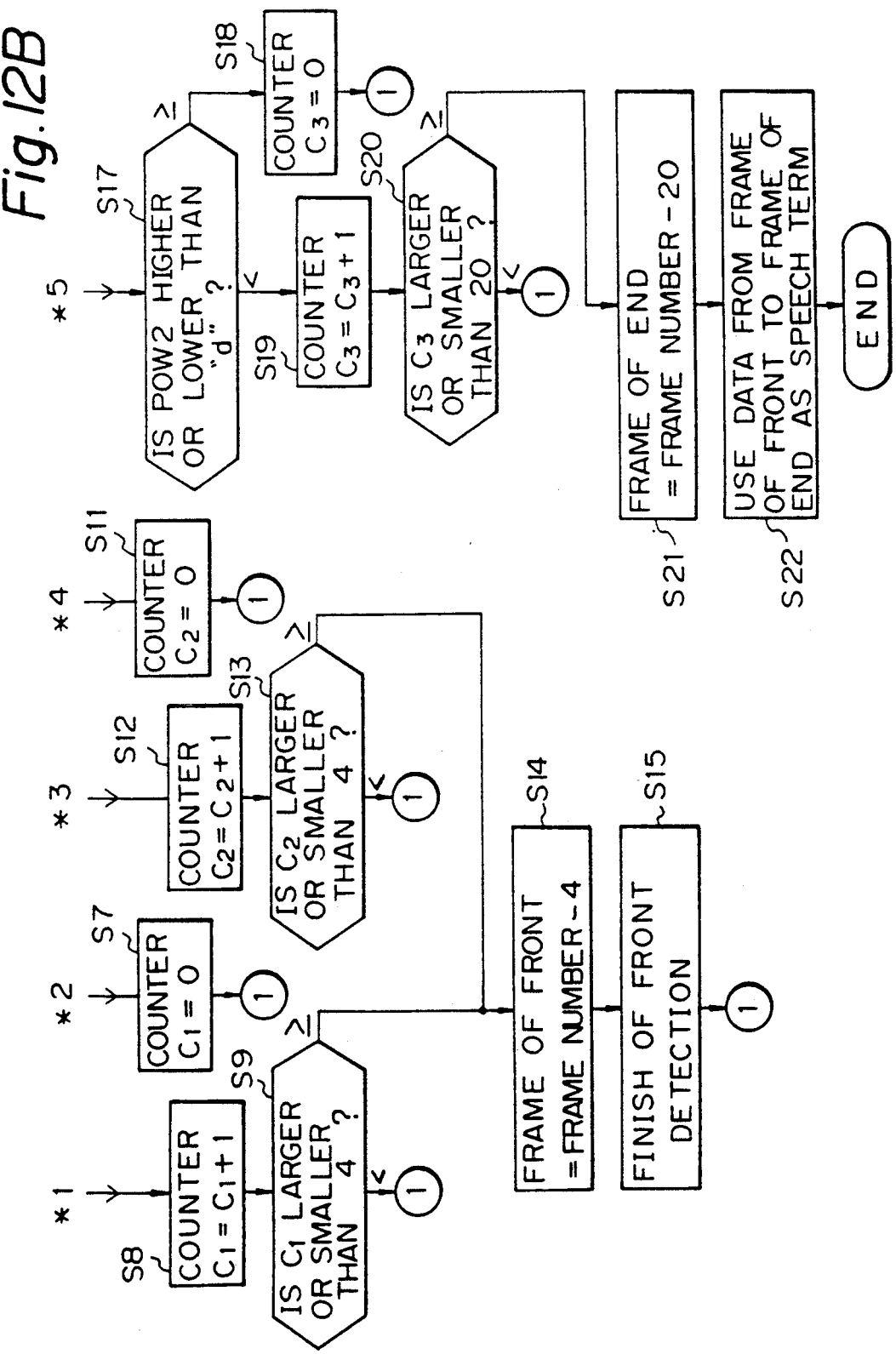

METHOD AND APPARATUS FOR EXTRACTING ISOLATED SPEECH WORD

This application is a continuation of application Ser. No. 07/287,284, filed 12/21/88, now abandoned.

BACKGROUND OF THE INVENTION

1. Field of the Invention

The present invention relates to a method and apparatus for extracting an isolated speech word to be used in an isolated speech word recognition apparatus and the like.

2. Description of the Related Art

In, for example, an isolated speech word recognition apparatus, each speech word is first extracted from an input speech signal and then the extracted speech word is compared with isolated speech words stored in a dictionary to conduct an isolated speech word recognition. In this speech word recognition, each isolated speech word must be extracted without error, i.e., no consonant and/or vowel of each speech word can be overlooked.

Prior related art to the present invention is disclosed in the publication, OKI electric company research and development report, No. 128, Vol. 52, No. 4 ('985) "A speech recognition LSI for an independent talker with 10 words". According to this publication, the front and end of each isolated speech word are detected, to extract each speech interval, by the process described below. When the front of the speech word is to be detected, the existence of the front is determined, if four or more frames (each frame appears for 10 ms and shows whether the level detected is higher than a predetermined level) are produced successively at the point at which such frames have occurred first. In this case, each frame exhibits a speech power which is obtained by averaging the speech powers detected at respective predetermined frequencies within a speech frequency band. If the existence of the front is determined merely by observing a time when the average speech power becomes higher than the predetermined level, to differentiate same from the atmospheric noise, an incorrect determination may be made due to an instantaneous rise of power in, for example, the atmospheric noise. Therefore, four or more successive frames are used to determine the existence of the actual front, as mentioned above, to avoid such an incorrect determination.

When the end of the speech word is to be detected, the existence of the end is determined, if four or more frames (each frame appears for 10 ms and shows that the level detected is lower than the predetermined level), are produced successively at the point at which these frames occurred first. In this case, if the existence of the end is determined merely by observing a time when the average speech power becomes lower than the predetermined level, an incorrect determination may be made due to a interpretation of a pseudo non-speech interval as the end of the speech word. Such a pseudo non-speech interval usually occurs between two adjacent speech segments, thus eight or more successive frames are used to determine the existence of the actual end, as mentioned above, to avoid such an incorrect determination.

This prior art has a problem in that a consonant may be overlooked when detecting the same from the extracted speech word, and thus a correct speech recognition cannot be made, as explained later in detail.

Other prior art described in Japanese Unexamined Patent Publication No. Sho 60 (1985)-260096, refers to a measure for overcoming a problem analogous to the above mentioned problem of the previously illustrated art. Nevertheless, this latter prior art is effective only in avoiding overlooking a word including the vowel "i", for example, "ichi" and "ni", which are Japanese words corresponding to "1" and "2" in English, respectively. This avoids the overlooking by selectively lowering a threshold level for extracting the speech interval whenever it is determined that an input speech signal includes the vowel "i".

SUMMARY OF THE INVENTION

Accordingly, an object of the present invention is to provide a method and apparatus for extracting an isolated speech word. In particular, the method and apparatus effectively ensure an extraction of each speech word interval without overlooking any consonant contained in the speech interval.

To attain the above object, the present invention is constructed by a provision of, at least, a means for dividing an input speech signal into a high frequency band, signal and a low frequency band signal, and another unit for detecting a front or end of a speech word from the high frequency band signal, and at the same time, a front or end of the same speech word from the low frequency band signal, separately. The former unit extracts a consonant from the speech word at the high frequency band side.

BRIEF DESCRIPTION OF THE DRAWINGS

The above object and features of the present invention will become more apparent from the following description of the preferred embodiments with reference to the accompanying drawings, wherein:

FIGS. 4A and 4B depict graphs showing the characteristics of sound pressure vs frequency;

FIGS. 11A and 11B are charts showing experimental data of the speech word extraction according to the present invention;

FIGS. 12A and 12B are flow charts representing a program to be executed by the microprocessor according to the method of the present invention;

DESCRIPTION OF THE PREFERRED EMBODIMENTS

Before describing the embodiments of the present invention, the related art and the disadvantages therein will be described with reference to the related figures.

Figure 1:
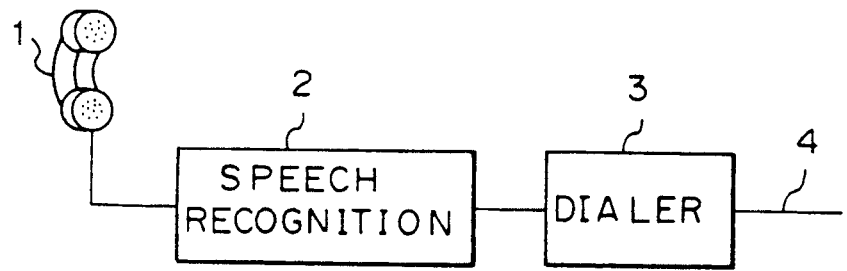
FIG. 1 is a block diagram showing an example of equipment to which the present invention can be applied.

FIG. 1 is a block diagram showing an example of an apparatus to which the present invention can be applied; i.e., a telephone set having a speech recognition function. In FIG. 1, the telephone set comprises a handset 1, a speech recognition apparatus 2, and a dialer 3 connected to an office line 4. Speech data for the names of other parties, specified in advance, is registered in the speech recognition apparatus 2 together with corresponding telephone number data. When the name of other party is spoken, the microphone of the handset 1 outputs a speech signal containing the spoken name to the speech recognition apparatus 2. The apparatus 2 recognizes the name, and then searches the telephone number data for the telephone number corresponding to the recognized name. The telephone number signal when found is given to the dialer 3, and the dialer 3 automatically provides the corresponding actual selection signal to an exchange office via the office line 4, in the form of dial tones or dial pulses.

Figure 2:
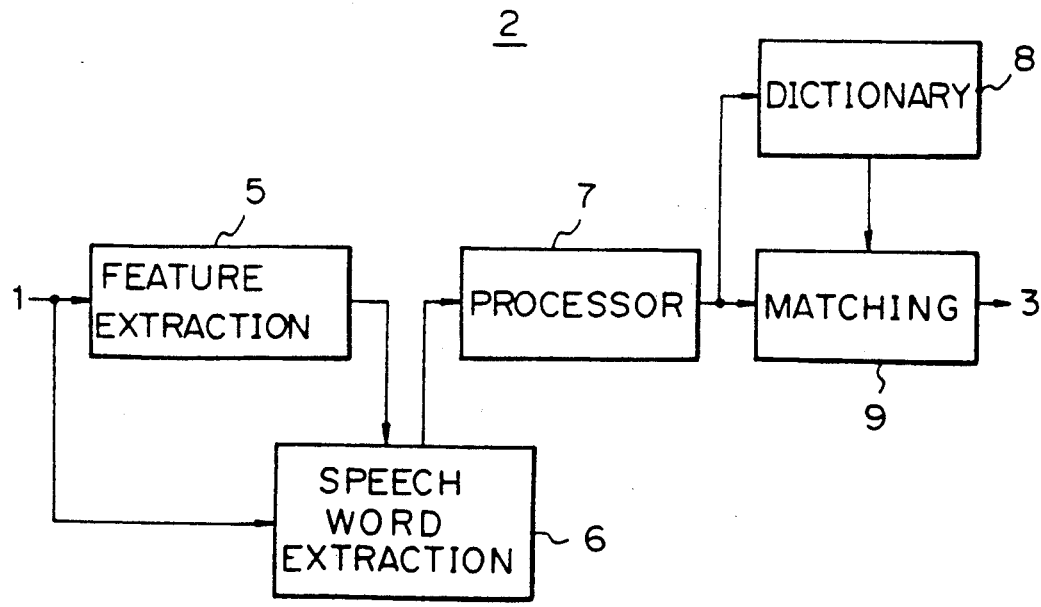
FIG. 2 is a detailed block diagram of the speech recognition apparatus shown in FIG. 1.

FIG. 2 is a detailed block diagram of the speech recognition apparatus shown in FIG. 1. In FIG. 2, the speech recognition apparatus 2 mainly comprises five units as illustrated. The speech signal sent from the microphone of the handset 1 is applied to a feature extracting unit 5 and to a speech word extracting unit 6, and the thus extracted word is sent to a processing unit 7. The processing unit 7 produces feature parameters of each word, which are sent to a matching unit 9 to produce the corresponding telephone number signal to be sent to the dialer 3, after a matching operation using a dictionary unit 8.

Details of the units 5, 7, 8 and 9 will not be further discussed hereinafter, as the present invention is directed towards the unit 6 in the speech recognition apparatus 2, i.e., the speech word extracting unit.

As mentioned previously, in, for example, an isolated speech word recognition apparatus, each speech word is first extracted from an input speech signal and then the extracted speech word is compared with isolated speech words stored in a dictionary to conduct an isolated speech word recognition. In this case, a formant region is one of the important parameters for this speech recognition.

Figure 3:
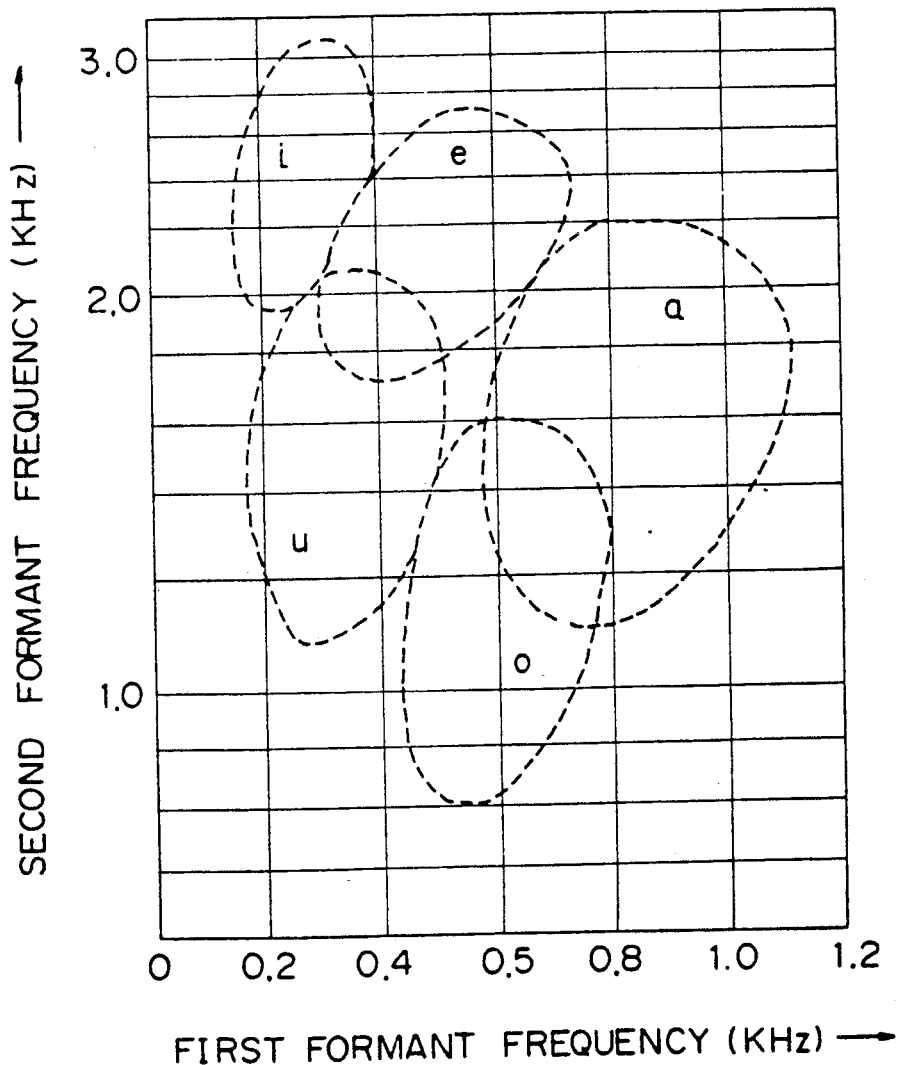
FIG. 3 depicts a known characteristic in terms of the formant regions.

FIG. 3 depicts a known characteristic in terms of formant regions. Specifically, the characteristic exhibits domains in which five Japanese vowels appear in terms of a first formant frequency (abscissa) and a second formant frequency (ordinate). The five domains are illustrated by broken circular lines to which five Japanese vowels, i.e., "a" (ar), "i" (ee), "u" (oo), "e" (ay), "o" (or) pertain, respectively. Note, similar characteristics may be exhibited with respect to vowels of a language other than Japanese. As seen from FIG. 3, the first formant frequencies of the vowels occur over the frequency band of from about 0.2 kHz to 1.1 kHz, and the second formant frequencies of the vowels occur over the frequency band of from about 0.8 kHz to 3 kHz. Namely, the frequency band of the vowels lies within from about 0.2 kHz to 3 kHz.

FIGS. 4A and 4B depicts graphs showing the characteristics of sound pressure vs frequency. In contrast to vowels, the frequency band of consonants is at a higher frequency than that of the vowels. For example, a sibilant sound "s" (FIG. 4A) and a frictional sound "f" (FIG. 4B) exhibit a frequency band of over 1 kHz, as shown in FIG. 4A and 4B. It should be understood that the present invention is effectively adopted for consonants containing sibilant and frictional sounds, and not for plosive sounds such as "p".

Figure 5:
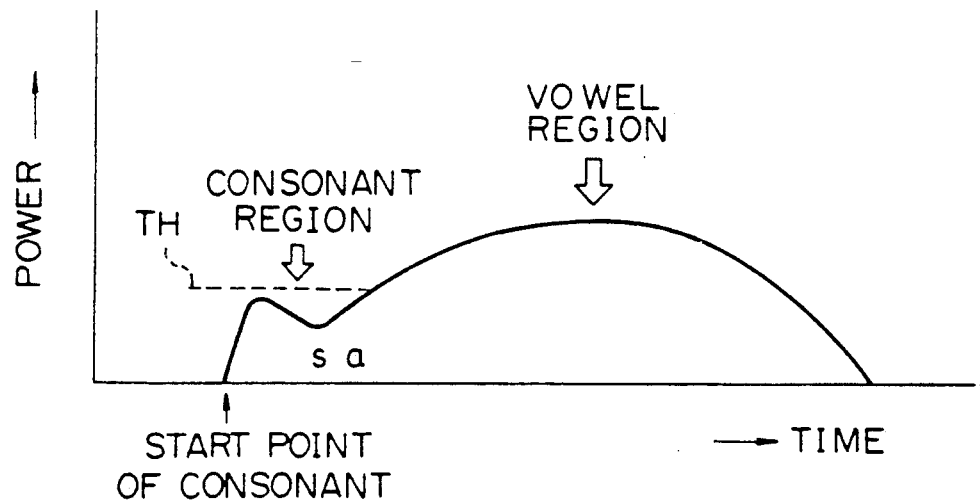
FIG. 5 depicts a graph showing the characteristic of power vs time.

FIG. 5 depicts a characteristic of power vs time. The characteristic is obtained by taking the example, "sa", which is a typical example of the sounds to which the present invention can be effectively applied i.e., a sibilant sound ("s") and a vowel ("a") connected in series as a pair. In FIG. 5, the ordinate thereof denotes a power which is an average of the powers obtained at predetermined frequencies within the usual frequency band of speech. Note, in general the consonant power is lower than the vowel power.

There has long been a demand for a system which prevents overlooking of a consonant, even for a sound such as "sa", to realize an accurate extraction of the isolated speech word. This sound occurs in, for example, the name "Satoh", one of the most popular Japanese names. In general, among the various consonants, a sibilant sound such as "s" and a frictional sound such as "f", under the classification of articulatory structure, are used in a sound composed of a consonant and a vowel connected in series as a pair.

According to the prior art, as shown in FIG. 5, the start point of the consonant is determined by determining a speech power which is an average of the powers obtained at the predetermined frequencies within the usual frequency band of speech. In this case, the determination of the start point of the consonant, i.e., the front of the word, is made by comparing the speech power (ordinate of the graph in FIG. 5) with a predetermined threshold level TH indicated by a broken line. Generally, the threshold level TH is set as the level depicted in FIG. 5, and therefore, a problem arises in that it is very easy to overlook the existence of the consonant, and thus an incorrect extraction of the word occurs, i.e., the consonant "s" is not recognized. In this case, it would be possible, in FIG. 5, to lower the level of the threshold level TH to ensure that not only the vowel "a" but also the preceding consonant "s" is recognized. This approach, however, can not be used, since the threshold level TH must be high enough to clearly differentiate speech sound from atmospheric noise. Namely, the threshold level TH must be maintained at a relatively high level.

Figure 6:
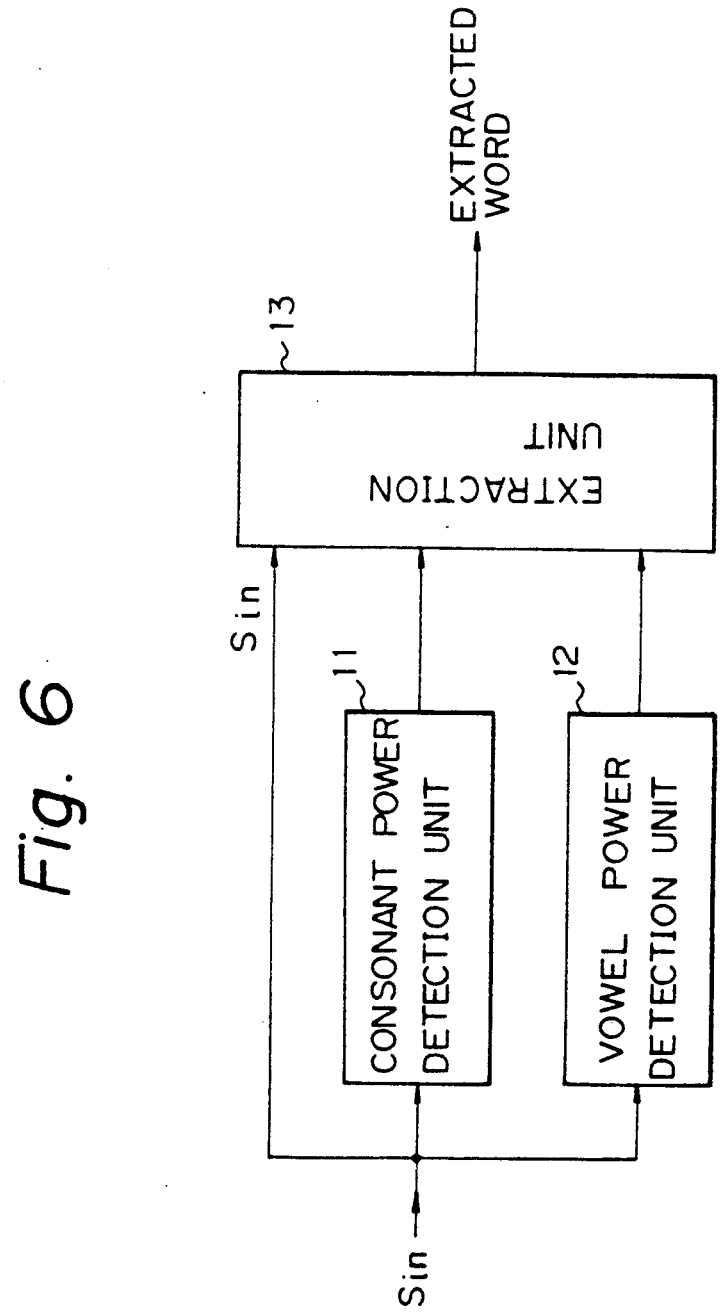
FIG. 6 is a general block diagram showing the principle of the present invention.

FIG. 6 is a general block diagram showing the principle of the present invention. According to the present invention, at least three major units are used, i.e., first, second, and third units, as denoted by reference numerals 11, 12 and 13, respectively. Specifically, 11 denotes a first units for receiving an input speech signal $S_{in}$ and detecting an average consonant power therefrom; 12 a second units for receiving the input speech signal $S_{in}$ and detecting an average vowel power therefrom; and 13 a third units for extracting an isolated speech word from the input speech signal $S_{in}$ by using the detected average consonant power and the detected average vowel power. In the example, the third units 13 is provided with a first threshold level (TH1) at which the existence or nonexistence of the consonant can be discriminated by comparing the consonant power from the first units 11 with TH1, and a second threshold level (TH2) at which the existence or nonexistence of the vowel can be discriminated by comparing the vowel power from the second units 12 with TH2. Namely, in the third units 13, the front of the consonant is detected under a condition wherein the average consonant power, which is higher than the first threshold level TH1, continues for a predetermined term, for example, 40 ms. Similarly the front of the vowel, which does not exist at the same time as the front of the consonant, is detected under a condition wherein the average vowel power, which is higher than the second threshold level TH2, continues for a predetermined term, for example, 40 ms. Thus, the front of the consonant or the vowel is specified at the starting point of the respective conditions. The end of the consonant is detected under a condition wherein the consonant power, which is lower than a third threshold level (TH3), continues for a predetermined term, for example, 200 ms. Similarly the end of the vowel, which does not exist at the same time as the end of the consonant, is detected under a condition wherein the average vowel power, which is lower than a fourth threshold level (TH4), continues for a predetermined term, for example, 200 ms. Thus, the end of the consonant or the vowel is specified as the point where the respective conditions are satisfied.

According to the present invention, the speech power per se, which is the average power of the sum obtained at the predetermined frequencies within the usual frequency band of speech, is not utilized. Namely, both a first speech power and a second speech power are utilized to extract the isolated speech word. The first and second speech powers can be called a consonant speech power and a vowel speech power. In this case, a low frequency band signal is used to specify the vowel region and a high frequency band is used to specify the consonant region. Note, the high frequency band signal may include the vowel frequency component. Then an average consonant power is calculated as an average value of the speech powers at predetermined frequencies within the high frequency band, and further, an average vowel power is calculated as an average value of the speech powers at predetermined frequencies within the low frequency band. Assuming that a speech signal is given which consists of only a consonant and does not contain a vowel, such as a name ending with the letter "t", the average speech power detected according to the present invention is higher than the average speech power detected in the prior art, since the former speech power is obtained as an average of powers at predetermined frequencies within a narrow band, i.e., high frequency band constituting the consonant, but the latter speech power is obtained as an average of powers at predetermined frequencies within a wide band, i.e., both the high frequency band constituting the consonant and the low frequency band constituting the vowel, which this assumed case, does not actually exist.

Namely, when the consonant power of the isolated speech word power becomes higher than the first threshold level (TH1) or when the vowel power of the isolated speech word power becomes higher than the second threshold level (TH2), and at the same time, the related state is maintained for a first predetermined term, for example 40 ms, continuously, the starting point of the state is used to specify the front of the speech word. Also, when the consonant power of the isolated speech word power becomes lower than the third threshold level (TH3) or when the vowel power of the isolated speech word power becomes lower than the forth threshold level (TH4), and at the same time, the related state is maintained for a second predetermined term, for example 200 ms, continuously, the starting point of the state is used to specify the end of the speech word. Accordingly, the isolated speech word can be extracted without overlooking the consonant, because the consonant is detected by using the average consonant speech power separately from the average vowel speech power.

Generally speaking, the above operation according to the present invention is carried out by the following steps: (a) dividing the input speech signal $S_{in}$ into a high frequency band signal and a low frequency band signal; (b) calculating an average high frequency band signal power of the respective signal components at predetermined frequencies within the high frequency band; (c) calculating an average low frequency band signal of the respective signal components at predetermined frequencies within the low frequency band; and (d) determining a front of the isolated speech word from the input speech signal $S_{in}$ when the average high frequency band signal power or the average low frequency band signal power is higher than the respective predetermined threshold level, i.e., TH1 or TH2. In practice, a further step (e) must be included, wherein an end of the isolated speech word is determined from the input speech signal when the average high frequency band signal power or the average low frequency band signal power is lower than the respective predetermined threshold level.

Figure 7:
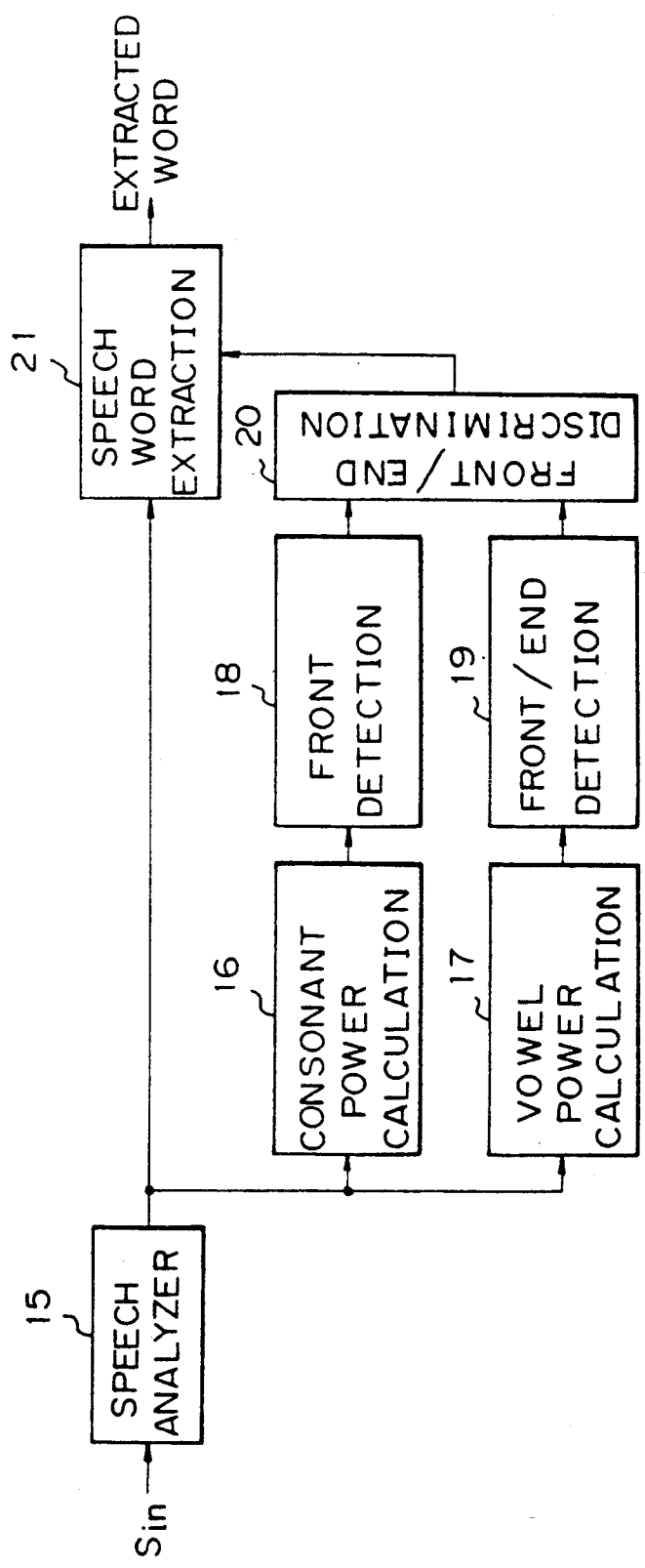
FIG. 7 is a block diagram of an apparatus for extracting an isolated speech word according to the present invention.

FIG. 7 is a block diagram of an apparatus for extracting an isolated speech word according to the present invention. As mentioned previously, the consonant generally exhibits a characteristic such that a peak (formant) appears at a relatively high frequency band, and this characteristic enables the remarkable detection of sibilant and frictional sounds. Based on this characteristic, as shown in the block diagram of FIG. 7, the average consonant speech power is calculated by using the powers obtained at predetermined frequencies within the frequency band of from 1.3 kHz to 3.1 kHz, in which the formants generated from the consonant are most likely to exist. This is used as the consonant detection power. Also, the average vowel speech power is calculated by using the powers obtained at predetermined frequencies within the frequency band lower than or equal to 1.3 kHz, in which the formants generated from the vowel are most likely to exist. This is used as the vowel detection power. The average consonant speech power and the average vowel speech power are compared with first and second threshold levels, to determine the existence or nonexistence of the consonant and the vowel, respectively. If the average consonant or vowel detection power has been maintained for, for example, 40 ms, the starting point of that state is specified as the front thereof. Note, this threshold level is predetermined as "10", as explained later with reference to FIGS. 11A and 11B.

Referring to FIG. 7, the first unit 11 (FIG. 6) comprises a speech analyzer 15 which receives the input speech signal $S_{in}$ and produces a consonant signal and a vowel signal separately therefrom, and a first calculating unit 16 for calculating the average consonant power based on the thus produced consonant signal. The second unit 12 (FIG. 6) comprises the speech analyzer 15, commonly used with the first unit 11, and a second calculating unit 17 which calculates the average vowel power based on the thus produced vowel signal. The third unit 13 (FIG. 6) comprises a first detecting unit 18, a second detecting unit 19, a discriminating unit 20 and a extracting unit 21. The first detecting unit 18 receives the output from the first calculating unit 16 and detects the front of the consonant signal. The second detecting unit 19 receives the output from the second calculating unit 17 and detects the front or end of the vowel signal. The discriminating unit 20 receives the respective outputs from the first and second detecting units 18 and 20 and discriminates the front of the consonant signal or vowel signal and the end of the vowel signal. The extracting unit 21 receives the input speech signal $S_{in}$ via the unit 15 and extracts the isolated speech word by using the discriminated front and end of the vowel or the thus discriminated front of the consonant signal.

Note, in a rare case, a Japanese name will end with a character having a consonant sound. Therefore, in FIG. 7, the first detecting unit 18 detects only the front of the consonant signal, from a practical view point. This may also occur with a language other than Japanese, in which the name will end with a character having a consonant sound. In such a case, it is obvious to employ a first detecting unit, instead of the unit 18, which can detect not only the front but also the end of the consonant signal. This will be exemplified hereinafter with reference to FIG. 13. The first detecting unit 18 detects the front of the consonant signal under a condition wherein the average consonant power, which is higher than the predetermined threshold level (TH1), continues for a predetermined term, e.g., 40 ms, and detects the end of the consonant signal under a condition wherein the average consonant power, which is lower than a predetermined level (TH3) continues for a predetermined term, e.g., 200 ms, wherein the front and end are specified as the point where the respective conditions are satisfied.

Figure 8:
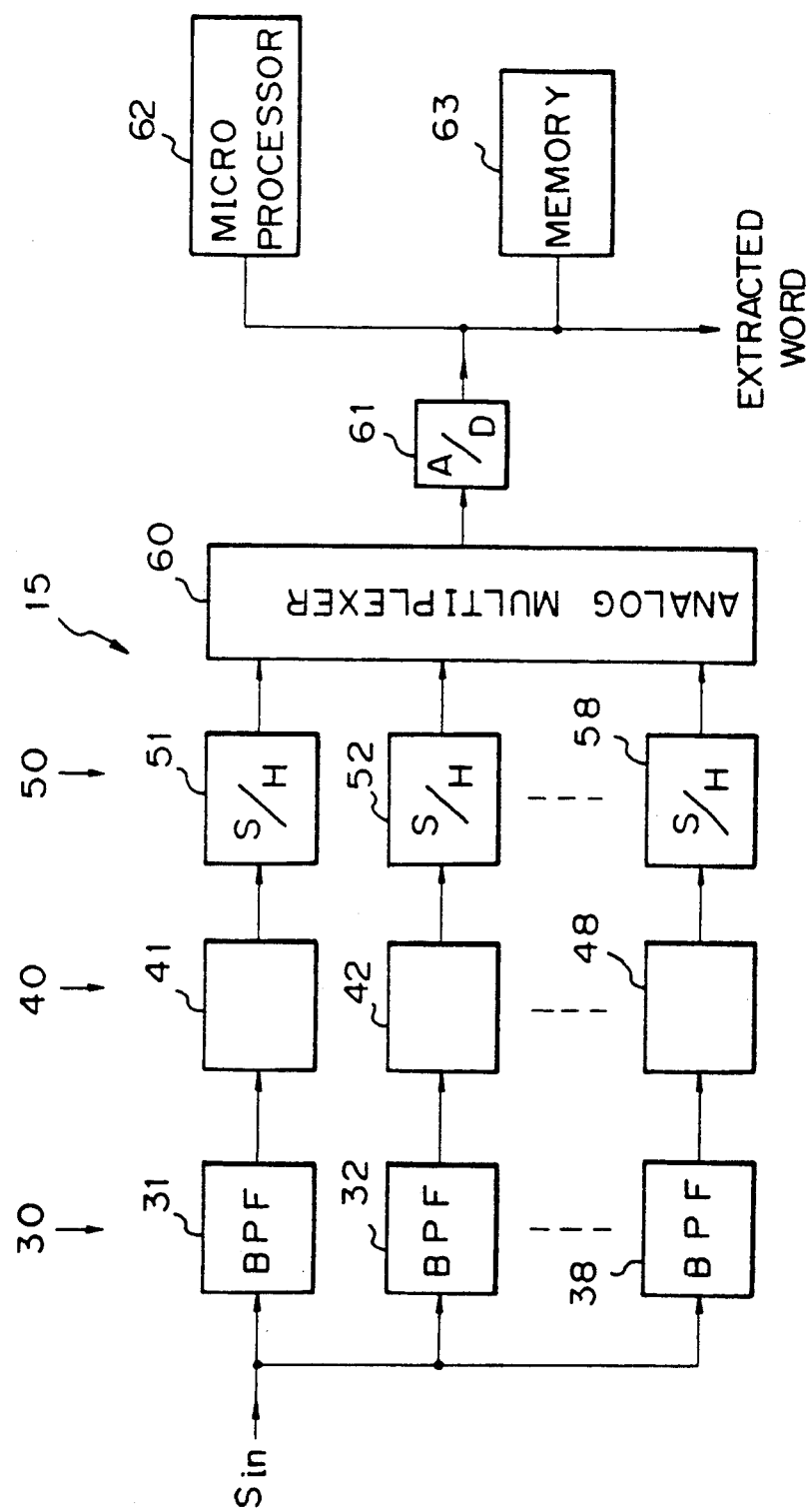
FIG. 8 is a circuit diagram of an example of the apparatus for extracting an isolated speech word according to the present invention.

FIG. 8 is a circuit diagram of an example of the apparatus for extracting an isolated speech word, according to the present invention. Note, in FIG. 7, the apparatus according to the present invention is constructed mainly by hardware, but in FIG. 8, the apparatus according to the present invention is operated mainly by software, with the aid of a microprocessor, based on the steps defined according to the present invention. Nevertheless, the speech analyzer 15 shown in FIG. 7 is commonly employed in the apparatus shown in FIG. 8, i.e., the speech analyzer of FIG. 7 is identical to a speech analyzer employed in the apparatus of FIG. 8, but this speech analyzer is shown in detail in FIG. 8. The speech analyzer of FIG. 8 (block 15 in FIG. 7) comprises: a filter bank 30 having both a high frequency filtering group for the detection of the consonant signal and a low frequency filtering group for the detection of the vowel signal; a rectifier bank 40 having both a high frequency side rectifier circuit group connected to the high frequency filtering group and a low frequency side rectifier circuit group connected to the low frequency filtering group; a sampling and holding bank 50 having both a high frequency side sampling and holding circuit group connected to the high frequency side rectifier circuit group and a low frequency side sampling and holding circuit group connected to the low frequency side rectifier circuit group; an analog multiplexer 60 receiving the outputs from the high frequency side and low frequency side sampling and holding circuit groups and producing data in the form of the frames consisting of a plurality of channels (refer to FIG. 10) indicating the consonant analog power detected at predetermined high frequencies and the vowel analog power detected at predetermined low frequencies; and an analog/digital converter (A/D) 61 for transforming the analog channels into digital data.

Figure 9:
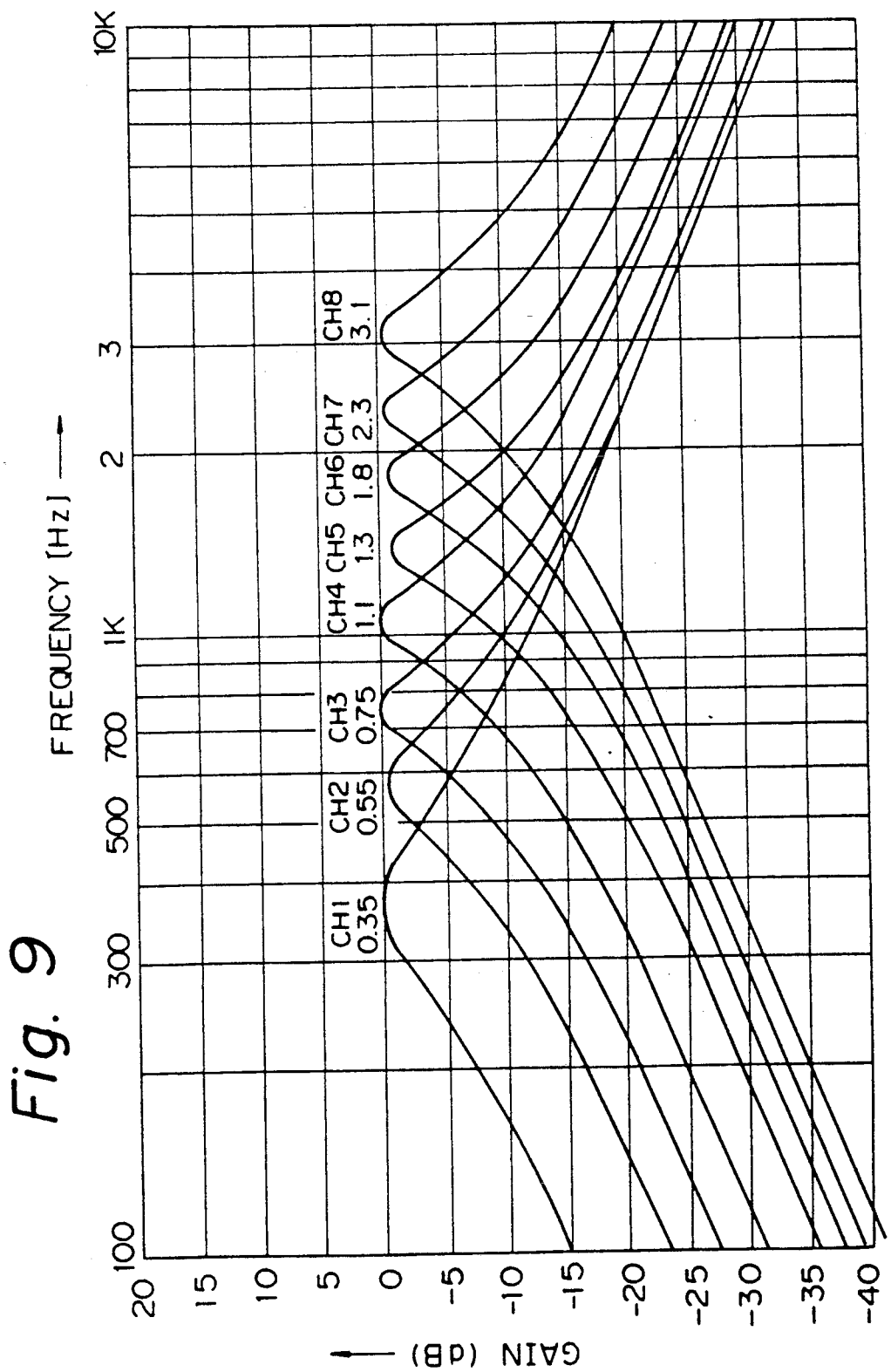
FIG. 9 depicts a graph illustrating the characteristics of the filter bank shown in FIG. 8.

FIG. 9 depicts characteristics of the filter bank shown in FIG. 8. As shown in FIG. 8, the filter bank 30 is constructed by, for example, eight band pass filters (BPF) 31 through 38 having different center frequencies, so that the speech frequency band from 300 Hz to 3,400 Hz is detected thereby. In this case, half of the BPF's, i.e., the BPF's 31 through 34 (33, 34 are omitted in FIG. 8) form the low frequency filtering group for the detection of the vowel speech power, so that the power component lying in the frequency band of from 300 Hz to 1,100 Hz is detected. The remaining BPF's, i.e., the BPF's 35 through 38 (35, 36, and 37 are omitted in FIG. 8) form the high frequency filtering group for the detection of the consonant speech power, so that the power component lying in the frequency band of from 1,300 Hz to 3,100 Hz is detected.

The thus detected speech powers are applied to the rectifier circuits 41 through 48 forming the rectifier bank 40, and transformed into DC signals thereby. The DC signals are then supplied to the sampling and holding circuits (S/H) 51 through 58 in which respective DC signals are sampled at every 10 ms and held to produce signals of each channels. These signals are then supplied to the analog multiplexer 60 for multiplexing.

Figure 10:
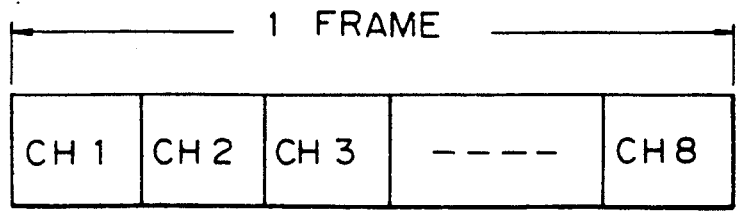
FIG. 10 is a diagram illustrating a signal format of the channel signals.

FIG. 10 illustrates a signal format of the channel signals. The filtered power signals from the BPF's 31 through 38 are allotted to the respective channels and formed as a frame by the analog multiplexer 60.

The analog values in each channel (CH1 through CH8) are transformed into corresponding digital values by the analog/digital converter 61. A microprocessor 62 reads the digital values as data for processing and stores the same in the memory 63. The microprocessor 62 can be functionally expressed as the blocks shown in FIG. 7. Referring to both FIGS. 7 and 8, the data for the channels CH1 through CH4, among the data CH1 through CH8 stored in the memory 63 at every 10 ms, is calculated by the second calculating unit 17 to average the data CH1 through CH4, so that the average vowel power is obtained, and then it is applied to the second detecting unit 19. The data for the channels CH5 through CH8, among the data CH1 through CH8 stored in the memory 63 at every 10 ms, is calculated by the first calculating unit 16 to average the data CH5 through CH8, so that the average consonant power is obtained, and then it is applied to the first detecting unit 18.

The first (consonant) detecting unit 18, detects whether or not the output value from the first (consonant) calculating unit 16 maintains a value which is higher than the first threshold level (TH1), for over 4 frames (the frame is shown in FIG. 10), i.e., 40 ms. The first frame number of the related consecutive frames over 4 is sent to the discriminating unit 20. The above threshold level TH1 and the frame number are exemplified in FIGS. 11A and 11B.

FIGS. 11A and 11B show experimental data for the speech word extraction according to the present invention. This experiment data was obtained by using the name "SATOU" (Refer to "S", "A", "T", "O" and "U" in time series shown at rightmost column in FIGS. 11A and 11B), as an example. The first threshold level (TH1) is indicated by "a" in FIG. 11A, which corresponds to a value "10". Further, the frame number is indicated by "F1" in the leftmost column of FIG. 11A.

Returning to FIGS. 7 and 8, the second (vowel) detecting unit 19, detects whether or not the output value from the second (vowel) calculating unit 17 maintains a value which is higher than the second threshold level (TH2) for over 4 frames, i.e., 40 ms. The first frame number of the related consecutive frames over 4 is sent to the discriminating unit 20. The above threshold level (TH2) and the first frame number are indicated by "b" and "F2", respectively in FIG. 11A.

The discriminating unit 20 detects either the frame F1 or the frame F2, whichever exists prior to the other, and sends the earlier frame data, as the front of the isolated speech word, to the extracting unit 21. In the example, the earlier frame is F1, conveying the sibilant consonant "S".

The second (vowel) detecting unit 19, also detects whether or not the output value from the second (vowel) calculating unit 17 maintains a value which is lower than the third threshold level (TH3) for over 20 frames, i.e., 200 ms. The first frame number of the related consecutive frames over 20 is sent to the discriminating unit 20. The above threshold level (TH3) and the first frame number are indicated by "d" and "F10", respectively in FIG. 11B.

The discriminating unit 20 discriminates whether or not the frame number F10 is sent after the detection of the front of the speech word. In the example, the frame number F10 is given after the detection of the front, and thus it is determined that the frame number F10 conveys the end of the speech word and this information is sent to the extracting unit 21.

The extracting unit 21 extracts the speech word from the input speech signal $S_{in}$ by using the thus detected front and end thereof. The frames read from the memory 63, between the thus detected front and end of the speech word, indicating data of the isolated speech word, e.g., "SATOU".

Note, the duration for determining the end of the speech word is set at 20 frames, i.e, 200 ms, as mentioned above, and is, of course, longer than 40 ms used for determining the front. This longer duration, e.g., 200 ms, is used to avoid an incorrect detection of the end of the speech word. Namely, there is at least one nonspeech period between each two adjacent speech segments, and such nonspeech period is not an actual end of the speech word.

Figure 12A:
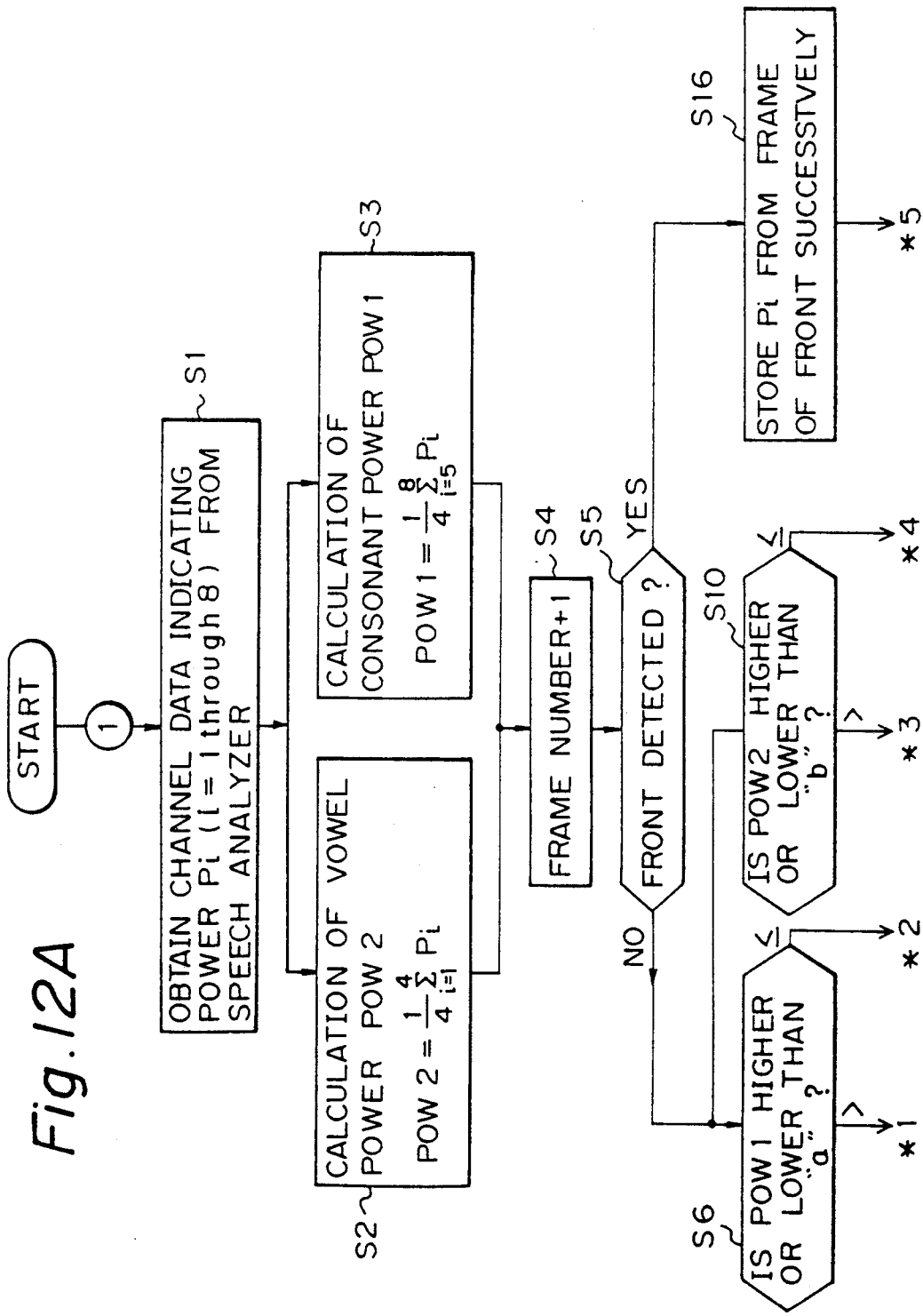

FIGS. 12A and 12B are flow charts representing a program to be executed by the microprocessor, according to the method of the present invention. The flow charts will be explained with reference also to FIG. 8 and FIG. 7.

In step S1, the output data (refer to CH1 through CH8 in FIGS. 11A and 11B) from the band pass filters (BPF's) 31 through 38 in the speech analyzer 15, is obtained.

In step S2, the average vowel power POW2

$$\left( = \frac{1}{4} \sum_{i=1}^{4} P_i \right)$$

is calculated and, in step S3, the average consonant power POW1 is calculated from the output data CH5 through CH8 in FIGS. 11A and 11B by the equation, $$POW1 = \frac{1}{4} \sum_{i=5}^{8} P_i.$$

In step S4, the present frame number is replaced by the next frame number, and then the method advances to step S5. If the front has not yet been detected, the process goes to steps S6 and S10.

In step S6, it is determined whether the power POW1 (consonant) is higher or lower than the threshold level "a". If the power POW1 is equal to or lower than the level "a", the process goes to step S7. In step S7, a count value C1 of a counter for counting the number of the frames is reset to zero, and the process returns to step 1.

If the power POW1 is higher than the level "a", the process goes to step where the count value C1 is incremented by 1. Then the process goes step S9, where it is determined whether the count value C1 is larger or smaller than 4. The number 4 denotes the number of consecutive frames. If the count value C1 is smaller than 4, the process returns to step 1. If the count value C1 is equal to or higher than 4, the process advances to step S14 where the frame having a frame number equal to the value obtained by subtracting the present frame number by 4 is specified as the frame of the front of the speech word to be detected. The subtraction of 4 units a return of the time when the front of the consonant was first detected. Then, in step S15, the detection of the front of the speech word is completed and the process returns to step 1.

In step S10, if the power POW2 is higher than the level "b", the process goes to step S12, where the count value C2 is incremented by 1. Then the process goes to step S13, where it is determined whether the count value C2 is larger or smaller than 4. The number 4 denotes the number of consecutive frames. If the count value C2 is smaller than 4, the process returns to step 1. If the count value C2 is equal to or higher than 4, then the process goes to step S14 in which the frame having the frame number equal to the value obtained by subtracting the present frame number by 4, is specified as the frame of the front of the speech word to be detected. The subtraction of 4 units a return to the time when the front of the vowel was first detected. Then, in step S15, the detection of the front of the speech word is completed and the process returns to step 1.

In step S5, it is determined whether or not the front of the speech word has been detected. If the front has been detected, the process goes to step S16, in which the data of eight channels (CH1 through CH4), starting from the frame of the front of the speech word, are successively stored as $P_i$ (refer to step S1) in the memory 63. Then the process goes to step S17, and it is determined whether the power POW2 (vowel) is higher or lower than "d". If POW2 is equal to or higher than "d", the process goes to step S18, where the count value C3 of a counter is reset to zero, and the process returns to step 1.

If the power POW2 is smaller than "d", the process goes to step S19 where the count value C3 of a counter is incremented by 1. The process then goes to step S20 where it is determined whether the count value C3 is larger or smaller than 20 (refer to the previous 20 consecutive frames). If the count value C3 is equal to or higher than 20, the process goes to step S21 where the frame having the frame number equal to the value obtained by subtracting the present frame number by 20, is specified as the frame of the end of the speech word to be detected. The subtraction of 20 units a return to the time when the end of the vowel was first detected. In step S20, if the count value C3 is smaller than 20, the process returns to step 1 . After step S21, the process goes to step 22 where the data from the frame of the detected front to the frame of the detected end, is used as a speech term for extracting the isolated speech word.

Comparing the steps in FIGS. 12A and 12B with the blocks shown in FIG. 7, step S1 corresponds to the speech analyzer 15, step S2 to the second calculating unit 17, step S3 to the first calculating unit 16, steps S10 through S13 to a part of the second detecting unit 19, steps S6 through S9 to the first detecting unit 18, S16 through S20 to the other part of the second detecting unit 19, steps S4, S16 and S22 to the extracting unit 21, and steps S5, S14, S15 and S21 to the discriminating unit 20.

Referring again to FIGS. 11A and 11B, the speech powers extracted according to the prior art are displayed in the row labeled "PRIOR ART", and the speech powers of the consonant and the speech powers of the vowel obtained according to the present invention are displayed in rows marked by an L-shaped symbol. Note, the extracted consonant power becomes larger than the threshold level "a" at frame F1 (frame number 106), i.e., the front of the sibilant consonant "S" is detected with a high sensitivity.

Assuming that the threshold level is set at "1" for detecting the speech power according to the prior art and for detecting both the vowel speech power and the consonant speech power according to the present invention, the frame having the frame number 108 indicates the front of the speech word if the prior art is adopted, but the frame having the frame number 106 indicates the front of the same speech word if the present invention is adopted. This shows that the effect of preventing on overlooking of the consonant is realized by the present invention. Note, according to experimental data obtained by the inventors, there was no difference in the effect of the prior art and that of the present invention with regard to the detection of the end of the speech word, i.e., both providing the frame number 148. Further, most of the speech powers representing "4" were derived from atmospheric noise in the room used for the experiment.

In the above example, the frequency band for the detection of the vowel is 0.35 kHz to 1.1 kHz and the frequency band for the detection of the consonant is 1.3 kHz to 3.1 kHz. Nevertheless, these values are only examples and other values can be selected. For example, the frequency band for the detection of the consonant can be 1.3 kHz to 10 kHz.

Figure 13:
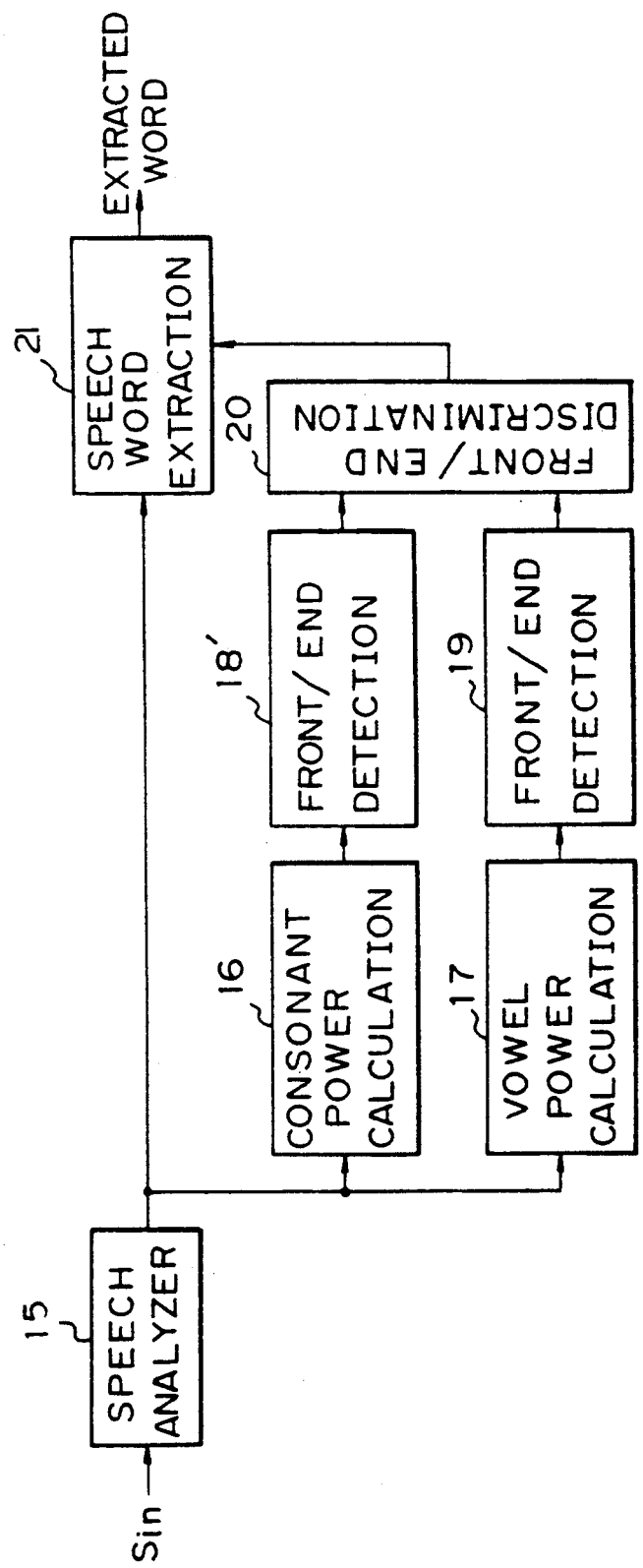
FIG. 13 is a block diagram of a modification of the apparatus shown in FIG. 7.

FIG. 13 is a block diagram of a modification of the apparatus shown in FIG. 7. As previously mentioned, regarding Japanese names, it is rare for the name to end with a consonant. However, it is possible for a name to end with a consonant, taking into account the names of other languages. To cope with such names the first detecting unit 18 in FIG. 7 is replaced by another first detecting unit 18' shown in FIG. 13. The unit 18' can detect not only the front but also the end of the speech word, with regard to a consonant thereof.

Figure 14:
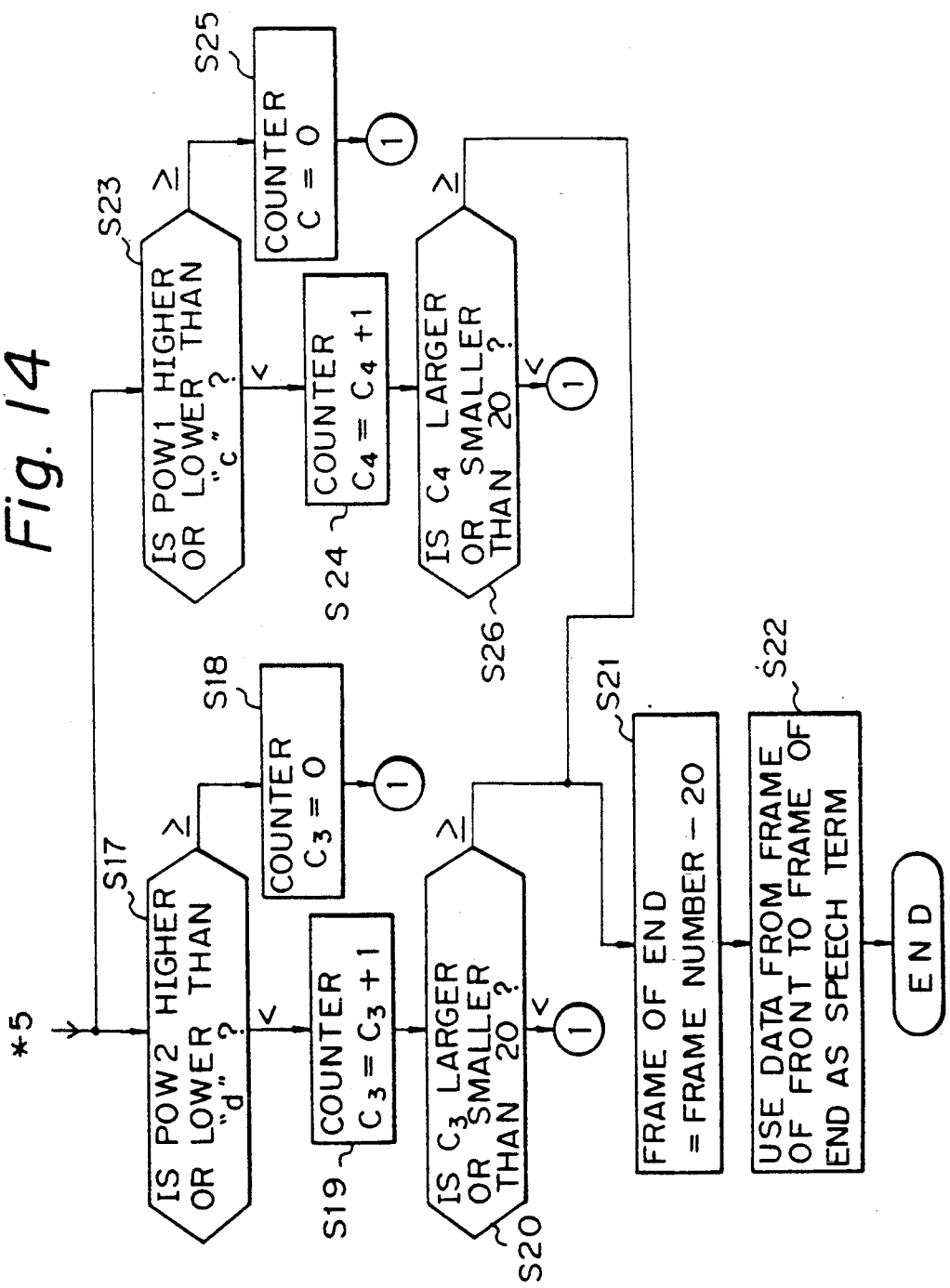
FIG. 14 is a flow chart of a part of the modification of the flow chart of FIG. 12B.

To conform with the above modification, the flow charts in FIGS. 12A and 12B must be modified. FIG. 14 is a flow chart showing a modification of the flow chart of FIG. 12B. In FIG. 14, steps S23 through S26 are added, for the detection of the end of the consonant. These steps are analogous to the corresponding steps S17 through S20.

As mentioned above in detail, according to the present invention, a consonant can be detected with high accuracy, although such a consonant is usually overlooked, compared to a vowel, and thus the extraction of an isolated speech word can be accurately realized with high quality.

We claim:

1. A method for extracting an isolated speech word, having a starting point and a finishing point, from an input speech signal, said method comprising the steps of:
    (a) dividing the input speech signal into a high frequency band signal within a high frequency band and a low frequency band signal within a low frequency band, including the substeps of:
        i) obtaining the high frequency band signal from a consonant of the input speech signal; and
        ii) obtaining the low frequency band signal from a vowel of the input speech signal;
        iii) calculating an average high frequency band signal power of signal components of the high frequency band signal having predetermined frequencies within the high frequency band;
        iv) calculating an average low frequency band signal power of signal components of the low frequency band signal having predetermined frequencies within the low frequency band;
    (d) determining the starting point of the isolated speech word from the input speech signal when one of the average high frequency band signal power and the average low frequency band signal power is higher than first and second predetermined threshold levels, respectively, including the substeps of:
        i) comparing the average high frequency band signal power with the first threshold level;
        ii) comparing the average low frequency band signal power with the second threshold level;
        iii) detecting whether one of a first state and a second state is maintained for a predetermined term, in the first state the average high frequency band signal power is higher than the first threshold level and in the second state the average low frequency band signal power is higher than the second threshold level; and
        iv) identifying a starting point of the isolated speech word where one of the first and second states begins; and
    (e) determining the finishing point of the isolated speech word from the input speech signal when one of the average high frequency band signal power and the average low frequency band signal power is lower than third and fourth predetermined threshold levels, respectively.

2. A method as set forth in claim 1, wherein said step (e) includes the steps of:
    (i) comparing the average high frequency band signal power with the third threshold level;
    (ii) comparing the average low frequency band signal power with the fourth threshold level;

(iii) detecting whether one of a third state and a fourth state is maintained for a predetermined term, in the third state the average high frequency band signal power is lower than the third threshold level and in the fourth state the average low frequency band signal is lower than the fourth threshold level; and (iv) identifying the finishing point of the isolated speech word where one of the third and fourth states begins.

3. A method as set forth in claim 2, wherein said steps (b), (c), (d) and (e) are carried out by digital processing.

4. A method for extracting an isolated speech word from an input speech signal, comprising:

first means for receiving the input speech signal and for detecting an average consonant power therefrom, said first means includes at least
  a speech analyzer for receiving the input speech signal and for producing a consonant signal and a vowel signal separately therefrom; and
  a first calculating unit, operatively connected to said speech analyzer, for calculating an average consonant power based on the consonant signal;

second means for receiving the input speech signal and for detecting an average vowel power therefrom, said second means includes at least
  said speech analyzer, commonly used with said first means; and
  a second calculating unit, operatively connected to said speech analyzer, for calculating the average vowel power based on the vowel signal; and third means for extracting the isolated speech word from the input speech signal in dependence upon the average consonant power and the average vowel power, said third means including:
  a first detecting unit, operatively connected to receive the average consonant power from said first calculating unit, for detecting one of a starting point and a finishing point of the consonant signal;
  a second detecting unit, operatively connected to receive the average vowel power from said second calculating unit, for detecting one of a starting point and a finishing point of the vowel signal;
  a discriminating unit, operatively connected to said first and second detecting units, for discriminating one of the starting point of the consonant signal and the vowel signal and for discriminating one of the finishing point of the consonant signal and the vowel signal; and
  an extracting unit, operatively connected to said speech analyzer and said discriminating unit, for receiving the input speech signal and for extracting the isolated speech word using the starting point and the finishing point of one of the consonant signal and the vowel signal.

5. An apparatus as set forth in claim 4,
wherein said first detecting unit detects the starting point of the consonant signal under a condition where the average consonant power is higher than a first predetermined threshold level and continues for a first predetermined term, and detects the finishing point of the consonant signal under a condition where the average consonant power is lower than a third predetermined level and continues for a third predetermined term, and wherein said second detecting unit detects the starting point of the vowel signal under a condition where the average vowel power is higher than a second predetermined threshold level and continues for a second predetermined term, and detects the finishing point of the vowel signal under a condition where the average vowel power is lower than a fourth predetermined level and continues for a fourth predetermined term.

6. An apparatus as set forth in claim 4, wherein said speech analyzer comprises:
  a filter band having a high frequency filtering group for the detection of the consonant signal and a low frequency filtering group for the detection of the vowel signal;
  a rectifier bank having a high frequency side rectifier circuit group connected to the high frequency filtering group and a low frequency side rectifier circuit group connected to the low frequency filtering group;
  a sampling and a holding bank having a high frequency side sampling and holding circuit group connected to the high frequency side rectifier circuit group and a low frequency side sampling and holding circuit group connected to the low frequency side rectifier circuit group;
  an analog multiplexer, operatively connected to the high frequency side and low frequency side sampling and holding circuit groups, for producing data in the form of a frame consisting of a plurality of analog channels indicating the consonant analog power detected at predetermined high frequencies and the vowel analog power detected at predetermined low frequencies; and
  an analog/digital converter, operatively connected to said analog multiplexer, for transforming the analog channels into digital data.

7. An apparatus as set forth in claim 4, wherein said first and second detecting units, said discriminating unit and said extracting unit are all realized by a microprocessor cooperating with a memory, and the microprocessor executes programs to determine the starting position and the finishing position of the input speech signal.

8. An apparatus as set forth in claim 5, wherein the first and second predetermined terms are smaller than the third and fourth predetermined terms.

9. An apparatus as set forth in claim 8, wherein the first and second predetermined terms are equal, and the third and fourth predetermined terms are equal.

10. A method for extracting an isolated speech word, having a starting point and a finishing point, from an input speech signal, said method comprising the steps of:
  (a) dividing the input speech signal into a high frequency band signal within a high frequency band and a low frequency band signal within a low frequency band, including the substeps of:
    i) obtaining the high frequency band signal from a consonant of the input speech signal; and
    ii) obtaining the low frequency band signal from a vowel of the input speech signal;
  (b) calculating an average high frequency band signal power of signal components of the high frequency band signal having predetermined frequencies within the high frequency band;
  (c) calculating an average low frequency band signal power of signal components of the low frequency band signal having predetermined frequencies within the low frequency band;

(d) determining the starting point of the isolated speech word from the input speech signal when one of the average high frequency band signal power and the average low frequency band signal power is higher than first and second predetermined threshold levels, respectively; and (e) determining the finishing point of the isolated speech word from the input speech signal when one of the average high frequency band signal power and the average low frequency band signal power is lower than third and fourth predetermined threshold levels, respectively, including the substeps of:

i) comparing the average high frequency band signal power with the third threshold level;

ii) comparing the average low frequency band signal power with the fourth threshold level;

iii) detecting whether one of a third state and a fourth state is maintained for a predetermined term, in the third state the average high frequency band signal power is lower than the third threshold level and in the fourth state the average low frequency band signal is lower than the fourth threshold level; and iv) identifying the finishing point of the isolated speech word where one of the third and fourth states begin.

* * * * *

UNITED STATES PATENT AND TRADEMARK OFFICE
CERTIFICATE OF CORRECTION

PATENT NO.   : 5,151,940
DATED        : SEPTEMBER 29, 1992
INVENTOR(S)  : MAKOTO OKAZAKI ET AL.

It is certified that error appears in the above-identified patent and that said Letters Patent is hereby corrected as shown below:

Col.  1,   line 24,  "Prior related art" should be --Prior art related--;
           line 26,  "('985)" should be --(1985)--.

Col.  2,   line  6,  "illustrated" should be --discussed prior--;
           line 24,  "means" should be --unit--.

Col.  4,   line 60,  "units" should be --unit--;
           line 62,  "units" should be --unit--.

Col.  7,   line 38,  "point" should be --points--.

Col. 10,   line 21,  "step" should be --step S8--.

Col. 11,   line 34,  " "1" " should be --"10"--.

Col. 13,   line 13,  "A method" should be --An apparatus--.

Signed and Sealed this

Twenty-sixth Day of October, 1993

Attest:

BRUCE LEHMAN

Attesting Officer          Commissioner of Patents and Trademarks